US009237124B2

(12) United States Patent
Arad et al.

(10) Patent No.: US 9,237,124 B2
(45) Date of Patent: Jan. 12, 2016

(54) SCALING OF VIRTUAL MACHINE ADDRESSES IN DATACENTERS

(75) Inventors: Carmi Arad, Nofit (IL); Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 103 days.

(21) Appl. No.: 13/548,902

(22) Filed: Jul. 13, 2012

(65) Prior Publication Data
US 2013/0016723 A1 Jan. 17, 2013

Related U.S. Application Data

(60) Provisional application No. 61/507,923, filed on Jul. 14, 2011, provisional application No. 61/515,217, filed on Aug. 4, 2011.

(51) Int. Cl.
*H04L 29/12* (2006.01)
*G06F 9/455* (2006.01)

(52) U.S. Cl.
CPC .......... *H04L 61/103* (2013.01); *G06F 9/45558* (2013.01); *G06F 2009/45595* (2013.01)

(58) Field of Classification Search
CPC ................ H04L 45/586; H04L 49/354; H04L 2012/5617; H04L 2012/5621; H04L 12/2859
See application file for complete search history.

(56) References Cited

U.S. PATENT DOCUMENTS 6,192,051 B1 * 2/2001 Lipman et al. ................ 370/389
6,563,823 B1 * 5/2003 Przygienda et al. .......... 370/392
7,283,523 B2 * 10/2007 Wang et al. ................... 370/389
2009/0037607 A1 * 2/2009 Farinacci et al. ............. 709/249
2010/0103837 A1 4/2010 Jungck et al.
2010/0146098 A1 6/2010 Ishizaki et al.
2010/0241664 A1 9/2010 LeVasseur et al.

(Continued)

FOREIGN PATENT DOCUMENTS

CN 101918940 A 12/2010

OTHER PUBLICATIONS

Albert Greenberg et al., VL2: A Scalable and Flexible Data Center Network; http://research.microsoft.com/apps/pubs/default.aspx?id=80693, SIGCOMM, © 2009, Association for Computing Machinery, Inc., 978-1-60558-594-9/09/08, Barcelona, Spain, Date: Aug. 17-21, 2009, pp. 12.

(Continued)

Primary Examiner — Ajay Cattungal

(57) ABSTRACT

A device in a server having a processor and a storage. The device has a protocol blind network path indication unit configured to obtain an indicator corresponding to a predetermined path to a data communication unit in the network using a destination address of a received data packet, an upstream communication unit configured to transmit a network protocol blind packet including the data packet and the indicator corresponding to the predetermined data path to the data communication unit in the network, a combiner configured to bind the indicator to the data packet received by the downstream communication unit, and a protocol blind correlation storage unit configured to provide information related to target addresses and indicators corresponding to a plurality of predetermined data paths in the network. The protocol blind network path indication unit obtains the indicator corresponding to a predetermined path by accessing the protocol blind correlation structure.

21 Claims, 11 Drawing Sheets

(56) References Cited

U.S. PATENT DOCUMENTS

2012/0307828 A1* 12/2012 Agarwal et al. .............. 370/392
2013/0191872 A1* 7/2013 Lee et al. .................... 725/78

OTHER PUBLICATIONS

D. Johnson et al., Mobility Support in IPv6; http://www.ietf.org/rfc/rfc3775.txt, Network Working Group, Request for Comments: 3775, Category: Standard Track, Copyright (C) The Internet Society, Date: Jun. 2004, pp. 155.
V. Fuller et al., Classless Inter-domain Routing (CIDR): The Internet Address Assignment and Aggregation Plan, http://www.ietf.org/rfc/rfc4632.txt, Network Working Group, Request for Comments: 4632, BCP: 122, Obsoletes: 1519; Category: Best Current Practice, Copyright (C) The Internet Society, Date: Aug. 2006, pp. 26.
P. Srisuresh et al., Traditional IP Network Address Translator (Traditional NAT), http://www.ietf.org/rfc/rfc3022.txt, Network Working Group, Request for Comments: 3022, Obsoletes: 1631, Category: Informational, Copyright (C) The Internet Society, Date: Jan. 2001, pp. 15.
J. Touch et al., Transparent Interconnect of Lots of Links (TRILL): Problem and Applicability Statement, http://www.ietf.org/rfc/rfc5556.txt, Network Working Group, Request for Comments: 5556, Category: Informational, Date: May 2009, pp. 16.
K. Kompella, et al., Virtual Private LAN Service (VPLS) Using BGP for Auto-Discovery and Signaling, http://www.ietf.org/rfc/rfc4761.txt, Network Working Group, Request for Comments: 4761, Category: Standards Track, Copyright (C) The IETF Trust, Date: Jan. 2007, pp. 27.
M. Lasserre, et al., Virtual Private LAN Service (VPLS) Using Label Distribution Protocol (LDP) Signaling, http://www.ietf.org/rfc/rfc4762.txt; Network Working Group, Request for Comments: 4762, Category: Standards Track, Copyright (C) The IETF Trust, Date: Jan. 2007, pp. 29.
IEEE 802.1 ah: Provider Backbone Bridging, http://www.ieee802.org/1/pages/802.1ah.html, Date: Jun. 12, 2008, pp. 1-6.
IEEE 802.1aq: Shortest Path Bridging, http://www.ieee802.org/1/pages/802.1aq.html, Date: Sep. 22, 2005, pp. 1-6.
IEEE 802.1 BR; Bridge Port Extension, http://www.ieee802.org/1/pages/802.1br.html, Date: 2011, pp. 1-3.
IEEE 802.1Qbh: Bridge Port Extension, http://www.ieee802.org/1/pages/802.1bh.html, Date: Dec. 9, 2009, pp. 1-4.
M. Scott, Ed. et al, Addressing the Scalability of Ethernet with MOOSE draft-malc-armd-moose-00, http://tools.ietf.org/html/draft-malc-armd-moose-00, Internet Engineering Task Force, Internet-Draft, Intended status: Informational, Version: 00, Date: Oct. 18, 2010, pp. 23.
Malcolm Scott, et al, Addressing the Scalability of Ethernet with MOOSE, http://www.cl.cam.ac.uk/~mas90/MOOSE/MOOSE-DC-CAVES.pdf, University of Cambridge Computer Laboratory, Date: Sep. 2009, pp. 1-8.
Cisco, Cisco Nexus 5000 Series Switches (Cisco Nexus 5010 and Nexus 5020 Switches) Data Sheet, http://www.cisco.com/en/US/prod/collateral/switches/ps9441/ps9670/data_sheet_c78-461802.html, Cisco Public Information, Date: Sep. 2009, pp. 17.
Mellanox Technologies, Vantage™ 6048, http://www.mellanox.com/content/pages.php?pg=products_dyn&product_family=103&menu_cection=71, Mellanox Technologies, Date: 2011, pp. 3.
Cisco Systems Inc., Ipv6 Mobility At-A-Glance, http://www.cu.ipv6tf.org/cookbook/ipv6mobility.pdf, Cisco Systems Inc., © 2005, p. 1.
Ipv6 Mobility, http://www.6diss.org/workshops/saf/mobility.pdf, Cisco Systems Inc., Date: Sep. 20, 2005, pp. 72.
Mobile IPv6, http://www.google.co.il/url?sa=t&source=web&cd=2&ved=0CCMQFjAB&url=http%3A%2F%2Fwww.ccs.neu.edu%2Fhome%2Frraj%2FG250Projects%2FMaulikBakhai.ppt&ei=MIEFTvOdEIW3hQep4KjIDQ&usg=AFQjCNFeLFvM6LyECV2eH3FI43wwg9kDBg, pp. 43.
IIS5711: Mobile Computing Mobile Computing and Broadband Networking Laboratory, CIS, NCTU, Introduction to Mobile IPv6, http://www.google.co.il/url?sa=t&source=web&cd=3&ved=0CCoQFjAC&url=http%3A%2F%2Fwww.item.ntnu.no%2Ffag%2Ftm8100%2FPensumstoff2004%2Fmipv6-bra.ppt&ei=MIEFTvOdEIW3hQep4KjIDQ&usg=AFQjCNHDZ1GMwHN760RmyHuaVcKtAoxJag, pp. 1-28.
Holger Zuleger, Mobile Internet Protocol v6, MIPv6, A brief introduction, http://www.hznet.de/ipv6/mipv6-intro.pdf, Date: Dec. 13, 2005, pp. 17.
Malcolm Scott, MOOSE: Multi-level Origin-Organised Scalable Ethernet, http://trac.tools.ietf.org/bof/trac/raw-attachment/wiki/BarBofsIETF78Arp222/arp222-MOOSE%20-%20IETF%2078%20Bar%20BoF.pdf, University of Cambridge Computer Laboratory, Date: Jul. 29, 2010, pp. 19.
P. Nikander et al., Host Mobility with the Host Identity Protocol, Network Working Group, Internet-Draft, Obsoletes: 5206 (if approved), Intended status: Standards Track, Date: Mar. 14, 2011, pp. 34.
D. Farinacci et al., Locator/ID Separation Protocol (LISP), Network Working Group, Internet-Draft, Intended status: Experimental, Date: Jul. 9, 2011, pp. 91.
M. Mahalingam, et al., VXLAN: A Framework for Overlaying Virtualized Layer 2 Networks over Layer 3 Networks, Network Working Group, Internet-Draft, Intended status: Experimental, Date: Aug. 26, 2011, pp. 20.
International Search Report and the Written Opinion from the International Searching Authority for PCT/IB12/53619, Dated: Nov. 21, 2012, pp. 9.

* cited by examiner

MODIFIED IEEE 802.1BR (BPE) E-Tag
(only modification relative to the standard are shown)

VMM -> EB
 E-CID – target-path-id

EB -> VMM
 I-ECID < 4K local virtual port (identical to BPE)
 I-ECID =>4K source-path-id

SCALING OF VIRTUAL MACHINE ADDRESSES IN DATACENTERS

CROSS-REFERENCE TO RELATED APPLICATION

The present invention claims priority from U.S. Provisional Patent Application No. 61/507,923 filed Jul. 14, 2011 and also from U.S. Provisional Application No. 61/515,217 filed Aug. 4, 2011, the disclosures of which are incorporated herein in their entirety by reference.

BACKGROUND

1. Field

The current disclosure relates to data communications, and particularly to scaling of addresses in communication networks.

2. Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Mega data centers can currently serve hundreds of thousands virtual machines. As a result, in conventional data center architectures, forwarding databases in a data center network may need to store address information for a large number of virtual machines in the data center. The complexity of requirements of mega data centers is magnified when other operational factors are considered such as the need to periodically migrate virtual machines within a data center and to maintain a high bandwidth communications environment.

SUMMARY

One or more embodiments of the disclosure relate to the scaling of addresses in communication networks while keeping the network addresses of the VMs constant, to network address scaling in the switches, to reducing the size of the forwarding table, to supporting high bandwidth utilization, to having short session set-up time, to using existing network protocol allowing deployment using commodity switches, or to keeping the server unaware of the network architecture.

According to an embodiment, there is provided a network device of a server having a processor and a storage. The network device includes a communication unit configured to receive a data packet to be transmitted to a destination in the data communications network, a protocol blind network path indication unit configured to obtain an indicator, corresponding to a predetermined network path in an overlay network, using a destination address of the data packet and a network protocol blind packet generation unit configured to generate a network protocol blind packet. The network protocol blind packet includes the data packet, and the indicator to the predetermined data path in the overlay network. In an embodiment, the predetermined network path is a path through the overlay network, and wherein the predetermined network path is compliant with a network protocol. The path through overlay network may be a single path or a multi-path to a specific destination. In an embodiment, in case of multicast traffic, the path may indicate a group of receivers, all according to the capabilities of the overlay network.

In an embodiment, the network device further includes a protocol blind correlation storage unit that store information related to target addresses and indicators corresponding to a plurality of predetermined data paths in the overlay network. The protocol blind network path indication unit obtains the indicator corresponding to the predetermined network path by accessing the protocol blind correlation storage unit.

In an embodiment, the predetermined network path is from a first network switch coupled to the server to a second network switch coupled to another server associated with the destination device.

In an embodiment, the indicator is a lookup key which includes less information than path characteristics information required to transmit the protocol blind packet over the overlay network.

According to an embodiment, there is provided a network switch having a processor and a memory. The switch includes a downstream communication unit configured to receive a network protocol blind packet including a data packet and an indicator corresponding to a predetermined data path to data communication unit in a data communications network, a protocol aware network path indication unit configured to obtain information according to a predetermined protocol related to the predetermined data path from a protocol aware correlation storage for transmitting the network protocol blind packet to the data communication unit and an upstream communication unit configured to transmit a network protocol aware packet via the obtained data path through the overlay network.

In an embodiment, the switch is coupled to one or more servers, and is configured to receive the data packet from a virtual machine define in one of the servers, and transmit the packet to a destination virtual machine associated with another switch in the data communications network.

In an embodiment, the switch includes a combiner configured to generate a network packet header that is compliant with the overlay network corresponding to the path information related to the data path obtained from the protocol aware correlation storage and envelops the data packet received by the downstream communication unit with the network packet header.

DRAWINGS

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
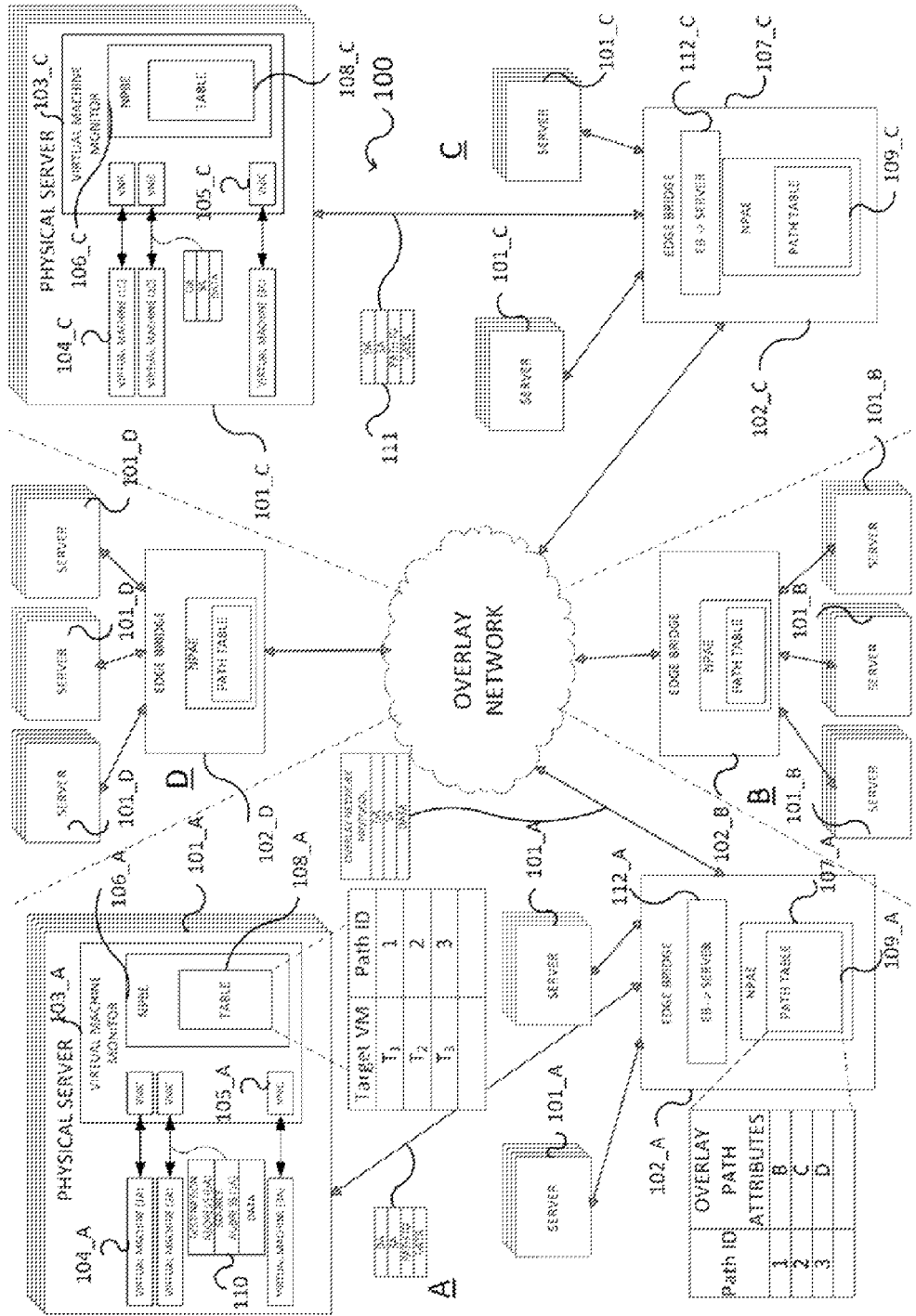
FIG. 1 illustrates a communication network according to an embodiment.

FIG. 1 shows a communication network 100 according to an embodiment of the present disclosure. The communication network 100 includes a plurality of physical locations (i.e., locations A-D), each provided with a plurality of servers 101_A, 101_B, 101_C and 101_D (101, in the general sense) and one or more Edge Bridges (EBs) 102_A, 102_B, 102_C and 102_D (102, in the general sense) for interconnecting the plurality of servers 101_A, 101_B, 101_C and 101_D to the network. A plurality of servers from a single location may be connected to a single EB or multiple EBs. Although FIG. 1 illustrates a communication network of servers in data centers, the embodiments may be applied in other networks such as mobile networks.

Each of the servers 101 has a virtual machine monitor (VMM) 103 (i.e., hypervisor) and plurality of virtual machines (VMs) 104 deployed therein. A Virtual Machine is a device corresponding to a real device, which is defined in computer code at a server. The VMs 104 are blind to the overlay network protocol in an embodiment. The overlay network is a network built on top of one or more existing networks. The VMM 103 includes a virtual network interface card (VNIC) 105 and a network protocol blind entity (NPBE) 106. The VNICs connects the VMs to the VMM. Each EB 102 includes a network protocol aware entity (NPAE) 107.

According to an embodiment, the communication network 100 is implemented according to an overlay network architecture. In the overlay network architecture, the servers and the overlay network use different networking protocols. The EBs 102 are then responsible for protocol conversion between levels of protocols in the hierarchy, keeping the protocol stack in the servers blind to the protocol used in the overlay network. The functionality of the EB 102 is split between a Network Protocol Blind Entity (NPBE) 106 and Network Protocol Aware Entity (NPAE) 107 in an embodiment.

In an embodiment, NPBE 106 holds a database that associates the Ethernet (ETH), Internet Protocol (IP) or Fibre Channel (FC) addresses of a destination VM 104 with a path-id and assigns the path-id to the destination VM. The NPAE 107 establishes paths to destination EBs 102 over the overlay network using networking protocols specific to a deployed overlay network technology, holds a database that associates path-ids with their overlay network protocol related properties (i.e., bridge target port, tunnel header format), holds a database that associates the ETH, IP or FC addresses of locally attached VMs with VM-ID, encapsulates a data packet according to the network protocol and forwards the data packet on the correct path. This allows for address scaling in the EB while keeping the server blind to the overlay network architecture thereby simplifying the server. Also, the communication between the NPBE and the NPAE can be implemented by adding a Tag or extending standard protocols, for example, IEEE 802.1BR.

A VM 104 at server 101_A generates a data packet 110 and transmits the packet 110 to its VNIC 105, which forwards the packet to NPBE 106_A. The NPBE 106_A holds (or accesses) a forwarding table 108_A that translates or changes a target-VM addresses (i.e., an address of a destination VM) into an index to a path table 109_A. In an embodiment, the index represents a path identifier (i.e., a path-id) corresponding to a path through the overlay network to an EB that is coupled to the network segment at which the server currently holding the destination VM is located. By representing only an index to a predefined path, the necessity of storing, at a server or VM, information (i.e., overlay path attributes and protocol information) for an entire path to a destination VM is alleviated. Path table 109_A is illustrated in FIG. 1 as part of NPAE 107_A in EB 102_A, as well as in each EB in FIG. 1. The path through the overlay network may be a single path or a multi-path to a specific destination. In an embodiment, in case of multicast traffic, the path may indicate a group of receivers, all according to the capabilities of the overlay network. The term, "forwarding table" has been selected for linguistic convenience only, and is not meant to be limitative. Structures other than tables may be used. This point applies as well to the term, "path table."

Path table 109_A stores a correlation between the indices in path table 109_A and the plurality of predetermined paths that are known to the EB (in the case of EB 102_A, the predetermined paths are paths B, C, and D which respectively connect to EBs 102 at physical locations B, C, and D shown in FIG. 1). More particularly, the correlation is between each path_id and overlay path attributes that indicate and define the predetermined path through the overlay network, and based on the overlay network protocol.

The NPBE 106_A holds information that associates, for example, the ETH/IP/FC addresses of a target VM with path identification information (i.e., path_id). This may be a database or other suitable form. When the data packet is transmitted from a VM to the network, the NPBE looks up a path_id in the database and assigns the path_id to the target of the data packet. For instance, as shown in expanded table 108_A, the target address $T_2$ is associated with path_id 2. After the path_id is retrieved, the data packet including the path_id is transmitted to the EB 102_A. By representing only an index (i.e., path-id) to a predefined path, the necessity of storing, at a server or VM, information (i.e., overlay path attributes and protocol information) for an entire path to a destination VM is alleviated.

At the EB 102_A, the NPAE 107_A establishes paths to the target Edge-Bridges 102_B, 102_C and 102_D using, for example, the networking protocols specific to the deployed overlay network technology. Specifically, the NPAE 107_A holds information, in a database or other suitable form, that associates path_ids with their network protocol related properties such as Bridge target port, tunnel header format, etc. In an embodiment, the path designates a path through the communication network to an EB that is coupled to a physical server at which the respective destination VM is located. When the data packet from a VM 104 is transmitted to the network, the NPAE 107_A encapsulates the packet according to the network protocol and forwards it on the correct path. For instance, as shown in expanded table 109, the path_id 2 is associated with EB at location C (i.e., path to 102_C), and the data packet is encapsulated using the network protocol characteristics of the path to EB_102_C and transmitted through the network.

In an embodiment, EB 102_C receives the encapsulated packet from the overlay network and removes the outer header used for transporting the packet over the overlay network, and adds a path-id corresponding to the path of the packet though the network, such that the original header and payload remain as shown in element 111 in FIG. 1. After removing the outer header, the EB 102_C performs a look up to determine a port in the physical server 101_C associated with the VM that is the recipient of the data packet.

The NPAE 107_C, in EB 102_C, may hold a database or other suitable structure that associates, for example, the ETH/IP/FC addresses of locally attached VMs with NPAE port on which the VM is connected. When the data packet is transmitted from the overlay network to a target VM, the NPAE 107_C looks up the ETH/IP/FC address for locally attached VMs and forwards the data packet to the matching target VM (i.e., port in the physical server 101_C associated with the target VM.

In an embodiment, when the NPAE 107_C transmits a packet received from the overlay network to the NPBE 106_C, the NPAE 107_C removes the outer header (i.e., the tunnel header associated with the overlay network), and adds a source path-id corresponding to the path of the data packet from the source EB through the overlay network. The path-id may be included in the packet by adding a new Tag or extending standard protocols, for example, IEEE 802.1BR. The path-id is transmitted to the NPBE 106_C to update the forwarding table 108 of NPBE 106_C.

When the NPBE 106_C receives a data packet that has been received from the overlay network for a destination VM, the NPBE 106_C forwards the data packet to the destination VM as indicated by the VM address (or the VM-ID as indicated in the E-Tag or S-Tag according to IEEE 802.1BR or 802.1Qbg specification). In an embodiment, NPBE 106_C retrieves the path-id from the packet and updates the forwarding table 108 of NPBE 106_C.

Typically, a VM 104 actively communicates with only a small number of other VMs 104. Therefore, the size of the forwarding table 108 is about the aggregated size of the Address Resolution Protocol (ARP) caches of the individual VMs 104 hosted by a given server 101. Furthermore, in an embodiment, the forwarding table 108 distributed among about 20-50 servers (NPBEs 106) all being served by a single NPAE 107, and as such, every server may hold 1/20 to 1/50 of the forwarding table 108 in it was located in the NPAE, for example.

In addition, by hosting the forwarding table 108 in the NPBE 106 of server 101, the cost of memory is significantly reduced. Typically, the EBs must forward packets in a rate 20-50 times faster than the servers. From this requirement, it follows that the EB must typically use proportionally faster memories, adding significant cost to storing the forwarding database in the EB. However, by moving the forwarding table 108 to the servers, the requirement for such a faster memory is alleviated, and the overall price of the EB can be reduced by reducing the memory cost.

Figure 2:
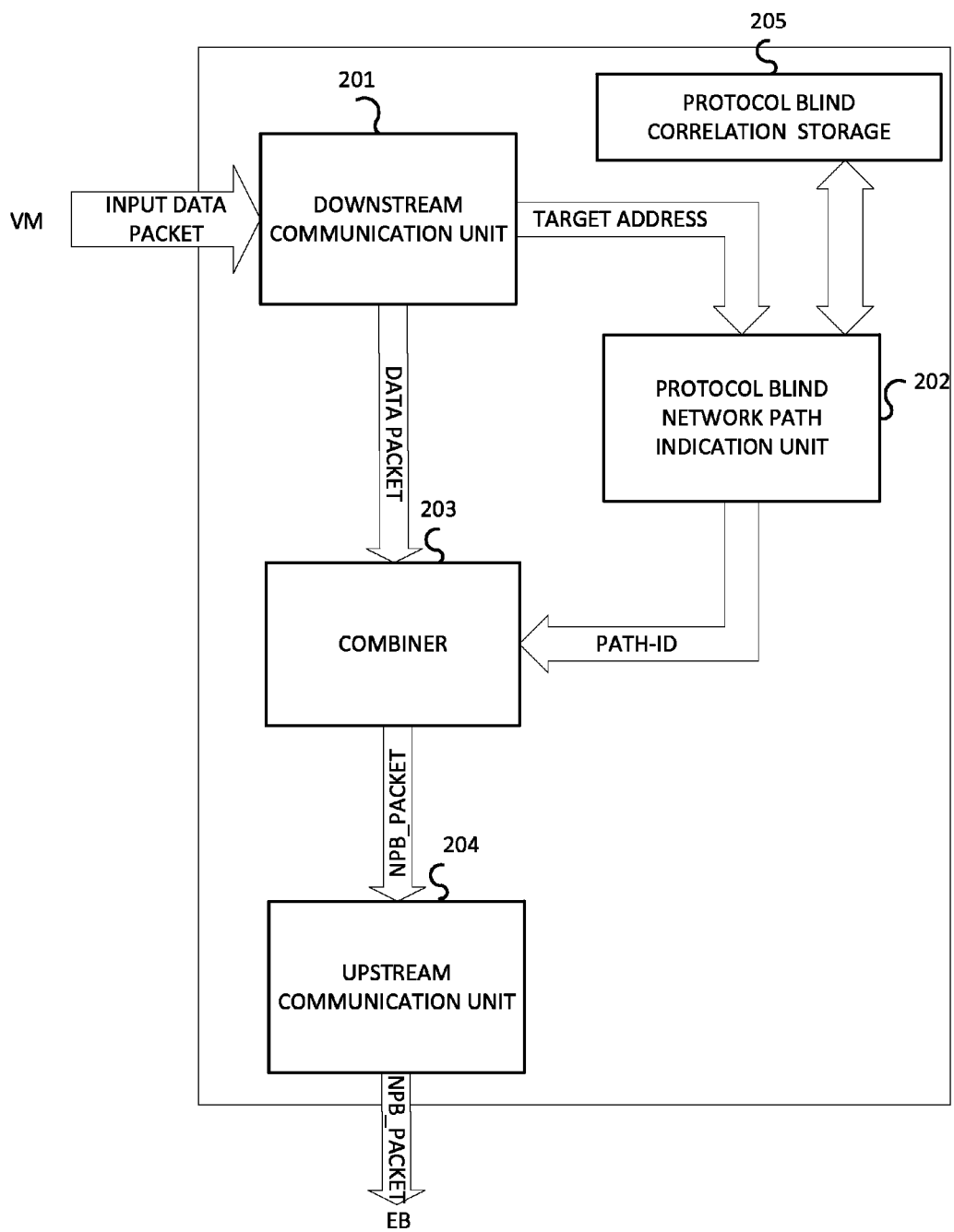
FIG. 2 illustrates an entity in the physical server according to an embodiment.

FIG. 2. shows an entity 200 in a physical server according to an embodiment. The functionalities of the entity are provided by a suitable combination of hardware and software elements. The physical server is a computer that has an operating system that supports virtualization so that various entities—virtual machines, VMM, network interfaces etc.—can reside in the physical server. Packets are transmitted from the server to the edge bridge which is a network device.

The entity may be separate from, part of, or coextensive with the VMM. The entity 200 includes a downstream communication unit 201, a protocol blind network path indication unit 202, a combiner 203, an upstream communication unit 204, and protocol blind correlation storage 205. The protocol blind correlation storage may be external to the entity, or integrated into the entity. The terms "downstream" communication unit and the "upstream" communication unit have been selected for linguistic convenience only, and is not meant to be limitative. The terms "downstream" and "upstream" refer to where they are located the stream, relative to each other in the network.

In an embodiment, the downstream communication unit 201 receives an input data packet from a VM 104 through a virtual network interface card (VNIC) 105 (FIG. 1) and provides a target address of the input data packet that is received with the input packet from the VM 104 to the protocol blind network path indication unit 202. The target address is the final destination virtual machine address of the data packet. The downstream communication unit 201 may be implemented in a tangible sense as I/O ports that are capable of receiving and transmitting data. For example, the downstream communication unit 201 may be implemented as actual circuits, as codes running on a processor device, or combination thereof.

The protocol blind network path indication unit 202 accesses the protocol blind correlation storage 205 using the target address, and obtains a path-id corresponding to a predetermined path to another data communication unit, such as an Edge Bridge, in the network. The combiner 203 binds the data packet to the path-id, generates a network protocol blind packet, and provides the network protocol blind packet to the upstream communication unit 204. The upstream communication unit 204 transmits the network protocol blind packet to a switch 300, such as an EB, which is described in more detail with reference to FIG. 3 below. The upstream communication unit 204, in an embodiment, are I/O ports that are capable of receiving and transmitting data.

Figure 3:
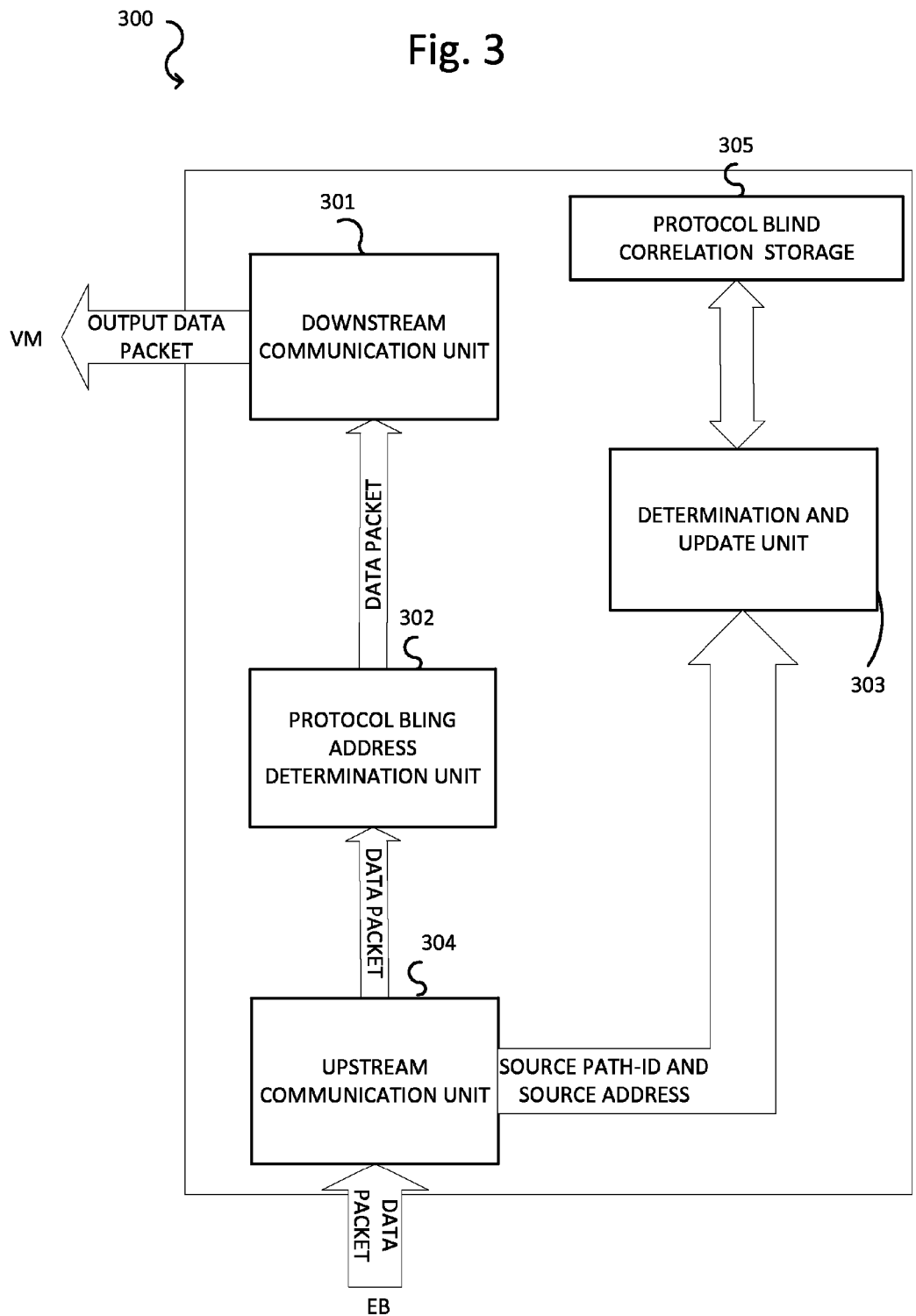
FIG. 3 illustrates an entity in the physical server according to another embodiment.

FIG. 3. shows an entity 300 in the physical server according to an embodiment, in which, the data packet is received from an EB 102_C and is provided to a VM deployed at server 101_C. The entity 300 may be separate from, part of, or coextensive with the VMM. The entity 300 includes a downstream communication unit 301, a protocol blind address determination unit 302, a path-id determination and update unit 303, an upstream communication unit 304, and protocol blind correlation storage 305. The protocol blind correlation storage 305 may be external to the entity, or integrated into the entity.

In an embodiment, the upstream communication unit 304 receives a data packet from an EB 102_C connected to the overlay network. In an embodiment, the data packet is transmitted through the overlay network from a source VM to the EB 102_C. The upstream communication unit 304 provides a target address of the data packet that is included in the received data packet to the protocol blind address determination unit 302. In an embodiment, the target address is the final destination virtual machine address of the data packet.

The protocol blind address determination unit 302 determines the destination VM of the data packet and provides the data packet to the downstream communication unit 301. The downstream communication unit 301 transmits that data packet to the destination VM. For instance, the protocol blind address determination unit 302 determines the VM address (or the VM-ID as indicated in the E-Tag or S-Tag according to IEEE 802.1BR or 802.1Qbg specification) included in the data packet, and provides the data packet to the destination VM.

In an embodiment, the upstream communication unit 304 provides a source path-id that is included in the received data packet to the path-id determination and update unit 303. The path-id determination and update unit 303 determines the path-id corresponding to the path of the data packet through the overlay network and updates the protocol blind correlation storage 305. In an embodiment, the protocol blind correlation storage is updated such that the source address (originator VM) of the data packet is associated with the path-id corresponding to the path of the data packet through the overlay network. The VMM 103_C uses the source path-id information to learn addresses as described in copending application 61/644,370.

In an embodiment, the units 201-205 and 301-305 illustrated in FIGS. 2 and 3 can be implemented as a single entity or a multiple entity.

Figure 4:
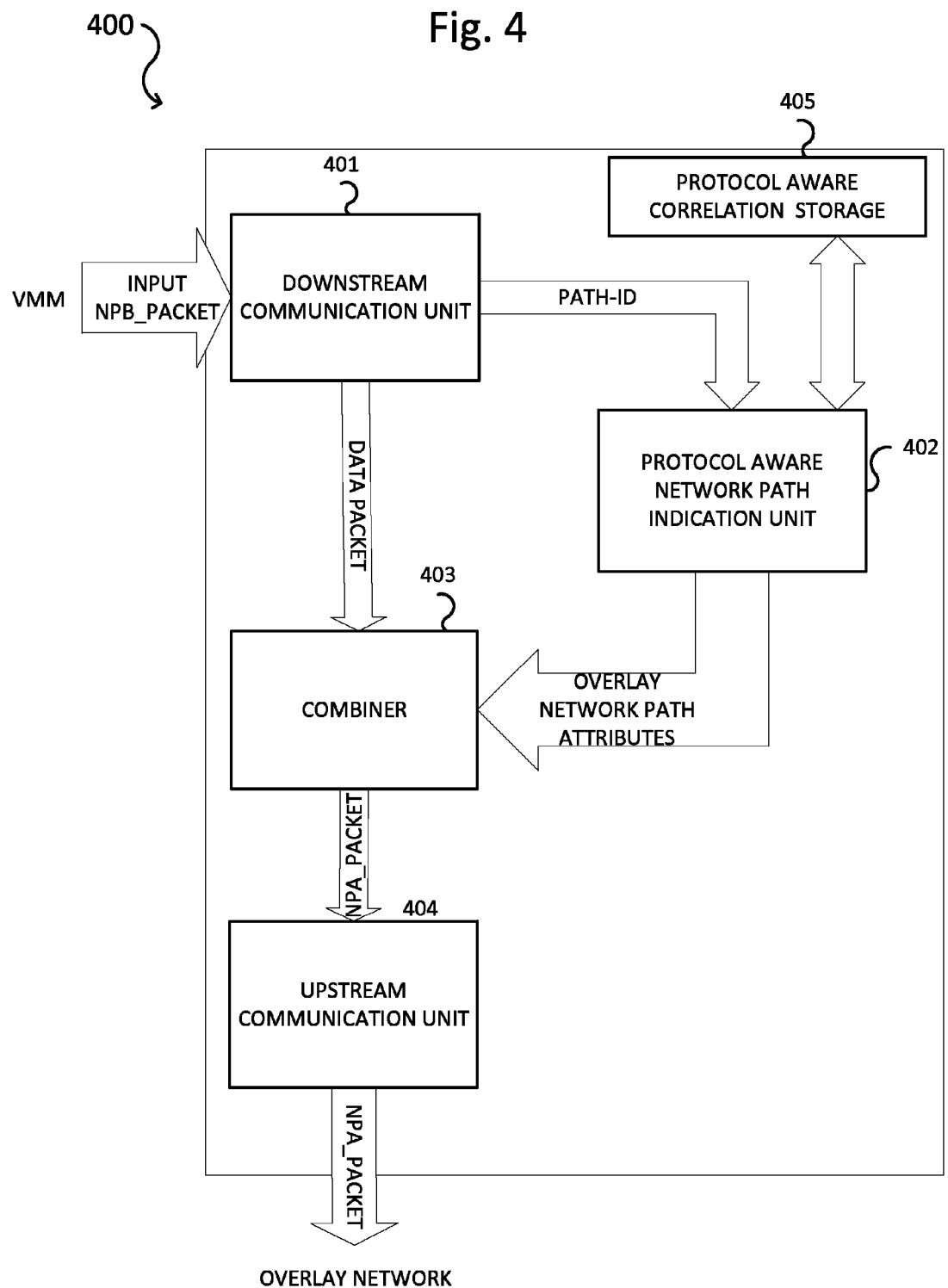
FIG. 4 illustrates switch circuit for connecting data communication unit to an overlay network according to an embodiment.

FIG. 4 shows a switch 400 according to an embodiment. In an embodiment, the switch 400 is an EB or other suitable network device in a network communicating with one or more servers. The switch 400 includes a downstream communication unit 401, a protocol aware network path indication unit 402, a combiner 403, an upstream communication unit 404, and protocol aware correlation storage 405. The protocol aware correlation storage 405 may be any suitable memory external to the packet processing circuit of the switch or may be integrated with the packet processing circuitry. In an embodiment, the protocol blind correlation storage 205, 305, and the protocol aware correlation storage 405 and 505 are implemented as a Ternary Content Addressable Memory (TCAM) or suitable RAM device.

In an embodiment, the downstream communication unit 401, the protocol aware network path indication unit 402, the combiner 403, and the upstream communication unit 404 are processing engines. It should be noted that the blocks 401-404 seen in FIG. 4 are arranged to conceptually depict the process flow for binding a header to a packet based on the path-id. In some embodiments, the blocks in a switch (or bridge) are serially arranged in a hardware processing pipeline, however pipeline arrangement is not mandatory. Descriptors for packets pass through all of the various engines in a serial manner, where they are either processed or not processed at respective stages.

The downstream communication unit 401 receives a network protocol blind data packet, for example, from a server 101_A and provides the path-id to the protocol aware network path indication unit 402. The downstream communication unit 401 is implemented as physical circuitry, including for example I/O ports, as code running on a processor device or combination thereof, that is capable of receiving and transmitting data.

The protocol aware network path indication unit 402 accesses the protocol aware correlation storage 405 and obtains the path characteristics (i.e., overlay network protocol, and next hop destinations and links in the overlay network) to be applied to the data packet. This information is provided to the combiner 403 as network path information. In the meantime, the downstream communication unit 401 provides the data packet to the combiner as well. The combiner binds the data packet received from the downstream communication unit 401 with the path characteristics, based on the network path information. The combiner thus generates a network protocol aware packet NPA_PACKET and provides the network protocol aware packet to the upstream communication unit. The upstream communication unit 404 transmits the network protocol aware packet through the network to another data communication unit. Here, the switch 400 receives a network protocol blind data packet and a path-id, and uses the path-id to identify a path and bind characteristics (i.e., overlay path attributes) of the predetermined path to the network protocol blind data packet to generate a network protocol aware data packet (i.e. a packet that is enveloped by suitable outer header for transmission on the overlay network to the edge bridge with which the destination VM (and its server) are associated.) The upstream communication unit 404 may be implemented as physical circuitry, including for example I/O ports, as code running on a processor device or combination thereof that is capable of receiving and transmitting data. In an embodiment, the protocol blind correlation storage 205 and 305 and the protocol aware correlation storage 405 are implemented as a Ternary Content Addressable Memory (TCAM) or suitable RAM device.

Figure 5:
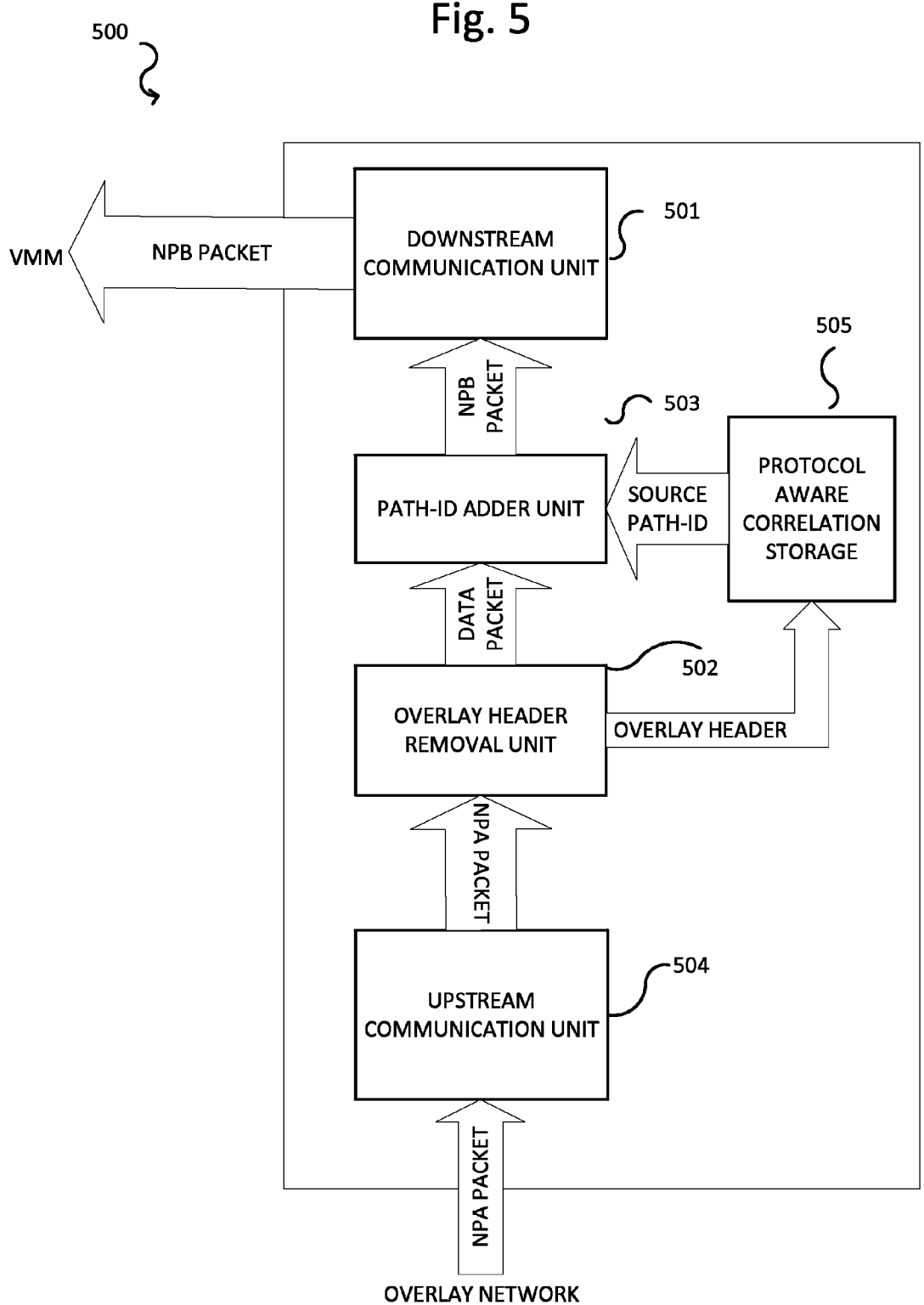
FIG. 5 illustrates switch circuit for connecting data communication unit to an overlay network according to another embodiment.

FIG. 5 shows a switch 500 according to an embodiment, in which, the data packet is received from the overlay network and transmitted to the server 101_C. In an embodiment, the switch 500 is an EB 102_C or other suitable network device in a network communicating with one or more servers. The switch 500 includes a downstream communication unit 501, an overlay network header removal unit 502, a path-id adder unit 503, an upstream communication unit 504 and protocol aware correlation storage.

In an embodiment, the upstream communication unit 504, receives a data packet from the overlay network and provides the data packet to the overlay network header removal unit 502. The overlay network header removal unit 502 removes the overlay network header (i.e., tunnel header) and provides the data packet to the path-id adder unit 503. In an embodiment, The path-id adder unit 503 adds a source path-id associated with the path of the data packet from the source (i.e., originator of the data packet) through the overlay network, to the data packet and provides the packet to the downstream communication unit 501. In an embodiment, the adder unit 503 obtains the path-id by searching the protocol aware correlation storage 505 using the overlay network header received from the overlay network header removal unit 502. In an embodiment, the path-id adder unit 503 determines the path-id associated with the path of the data packet through the overlay network, by looking up the protocol aware correlation storage 505 to determine the path-id. The downstream communication unit transmits the data packet to the server 101_C.

The units 401-405 and 501-505 of FIGS. 4 and 5 may be implemented as a single switch.

In an embodiment, the encapsulated network protocol aware packet is transmitted from an EB 102_A coupled to the server 103_A deploying the VM that originated the data packet to an EB 102_C coupled to a server 101_C deploying the virtual machine that is the recipient of the data packet. The encapsulated protocol aware packet is transmitted through the predetermined path in the overlay network determined using the path-id. In an embodiment, EB 102_C receives the protocol aware data packet and removes the outer header used for transporting the packet over the overlay network and adds a path-id corresponding to the path of the packet though the network, such that the inner header including the path-id, and payload remains as shown in element 111 in FIG. 1. After removing the outer header, the EB 102_C performs a look up in the EB-server forwarding table 112_C using the address of the VM that is the destination of the data packet and determines a port in the physical server 103_C associated with the VM that is the recipient of the data packet. Then EB 102_C transmits the data packet to the VM through the associated port in the server that deploys the VM.

According to an embodiment, the network protocol blind packet transmitted from the entity 200 to the switch 300, is encapsulated using ETH encapsulation. The ETH encapsulated packet includes a target address, source address, VLAN-tag (optional) in the header of the packet, and data and error detection code in the payload. In addition, the ETH encapsulated packet includes an additional header called E-Tag (802.1BR format). In an embodiment, the information regarding the path-id (i.e., an index to the path table) is encapsulated, for example, by modifying an E-Tag of the 802.1BR format. In another embodiment, a new Tag (i.e., P-Tag or Path-Tag) is created to indicate information regarding the path-id. Also, other standard protocols, such as MPLS, can be modified to include similar information regarding the path-id.

Figure 10:
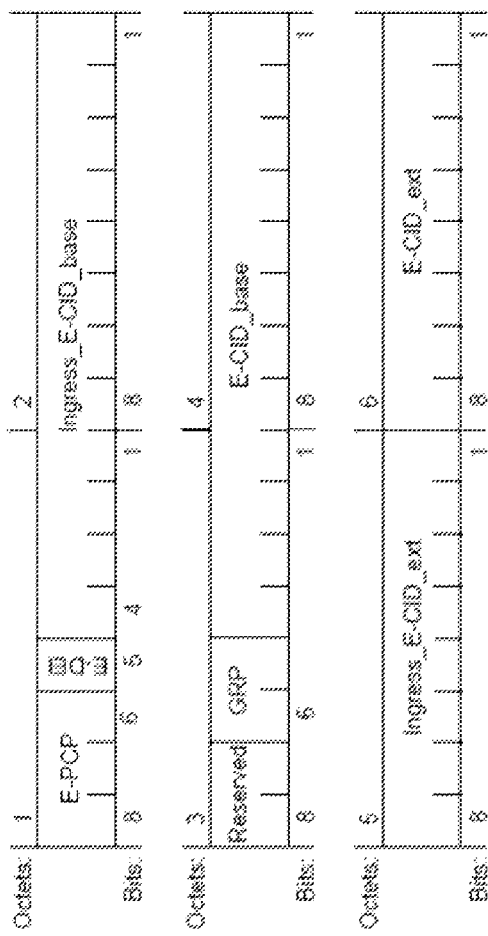
FIG. 10 shows a modification of an E-Tag format according to an embodiment.

FIG. 10 shows a modification of an E-Tag format according to an embodiment. In FIG. 10, when a data packet is transmitted from a network protocol blind entity to a network protocol aware entity (i.e., VMM in a server to EB), the E-CID includes the path-id (i.e., target path-id). The E-CID represents the concatenation of all or some of E-Tag<GRP, E-CID_ext, E-CID_base> fields. The target-path-id represents a single and multi-destination groups of EBs. The path-id information may be tunnel identifier or target EB address. In an embodiment, the E-Tag is removed from the encapsulated data packet before transmission of the encapsulated data packet through the overlay network. When a data packet is transmitted from an EB to the VMM, the I-ECID field includes the local virtual port and the source-path-id. The I-ECID represents the concatenation of all or some of E-Tag<Ingress_E-CID_ext,Ingress_E-CID_base> fields.

Figure 11:
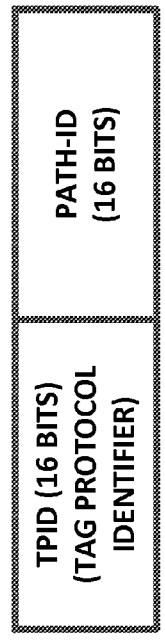
FIG. 11 shows a new P-Tag format according to an embodiment.

FIG. 11 shows a new Tag for signaling the path-id according to an embodiment. In FIG. 11, when a data packet is transmitted from a network protocol blind entity to a network protocol aware entity (VMM in server to EB), a Path-Tag (P-Tag) is included in the header of the existing protocol standards that use tagging, to signal the path-id information corresponding to the target (i.e., target path-id). When a data packet is transmitted from an EB to the VMM, the P-Tag is included in the header of the existing protocol standards that use tagging, to signal the path-id information corresponding to the source (i.e., source path-id).

In the IEEE 802,1Qbg (EVB) standard, the P-Tag is included as an inner tag to the S-channel (EVB), in an embodiment. In the IEEE 802.1BR (BPE) E-Tag, the P-Tag is included as an inner tag to the E-Tag (BPE), in an embodiment. In an embodiment, when E-Tag is in addition to P-Tag, the E-Tag is 802.1BR compliant and the E-Tag's meaning is not modified. In another embodiment, as shown in FIG. 10, the contents of the E-Tag are modified compared to 802.1BR, and P-Tag is not needed.

According to an embodiment, the network protocol blind indication unit 202 may be implemented by extending the Address Resolution Protocol (ARP) cache. In an embodiment, the ARP cache is extended to include path identification information (path_id). When the data packet is transmitted from a VM 104 to the network, the NPBE 106 performs a look up in the ARP cache using the target address, which is the destination address of the destination VM, and assigns a path_id to the target of the data packet. The ARP cache holds only the active sessions i.e., addresses that are frequently used by the servers and/or addresses that are recently used by server, in an embodiment. Therefore, the storage requirements of the network protocol blind indication unit 202 are expected to be small.

Figure 6:
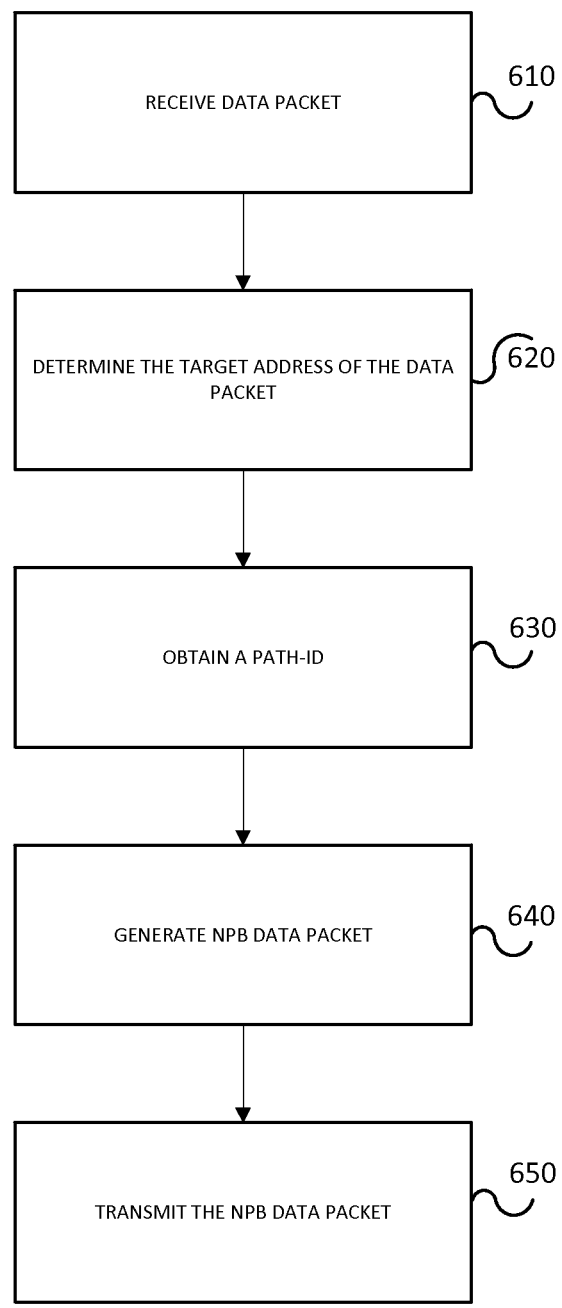
FIG. 6 illustrates a path-id look up method according to an embodiment.

FIG. 6 illustrates a path-id look up method performed by an entity 200 according to an embodiment.

Referring to FIG. 6, at 610, an input data packet is received from VM 104 through a virtual network interface card (VNIC) 105. The data packet includes a target address of the data packet, a source address of the data packet, the data, and the error detection code information (not shown), in an embodiment. The target address and the source address are VM addresses of the final destination virtual machine of the data packet and virtual machine that originated the data packet, respectively. In an embodiment, the virtual machine addresses are MAC addresses. At 620, the target address in the received data packet is determined and provided to the protocol blind network path indication unit 202. At 630, the target address of the data packet is used to obtain a path-id corresponding to a predetermined path to another data communication unit, such as the Edge Bridge with the destination VM is associated, in the network.

According to an embodiment, the protocol blind correlation storage 205 (i.e., a server to EB forwarding table) stores addresses of other VMs, and the path-id corresponding to the EBs 102 associated with the respective VMs 104. The protocol blind network path indication unit 202 accesses the protocol blind correlation storage 205 and retrieves a path-id corresponding to the address of the VMs stored in the protocol blind correlation storage 205 that matches the target address.

At 640, after obtaining the path-id, a network protocol blind packet is generated, in which the path-id is bound to the data packet. The network protocol blind packet includes a target address of the data packet, a source address of the data packet, a path-id, the data, and the error detection code information. In an embodiment, the target address of the data packet, the source address of the data packet and the path-id are included in the header of the network protocol aware data packet, and the data, and the error detection code information are included in the payload of the network protocol aware data packet. In an embodiment, the information regarding the path-id is encapsulated using E-Tag of the 802.1BR format, as seen in FIG. 10. In another embodiment, a new Tag (i.e., P-Tag or Path-Tag) is used to indicate information regarding the path-id, as seen in FIG. 11. Also, other standard protocols, such as MPLS labels, can be modified to include similar information regarding the path-id. When a data packet is transmitted from the server to the EB, the E-Tag includes target path-id information. The E-tag is removed before transmission of the encapsulated packet through the overlay network. In an embodiment, the E-Tag is removed from the encapsulated data packet before transmission of the data packet through the overlay network.

The path-id information may be a tunnel identifier or target EB address. At 650, the network protocol blind packet is transmitted to the EB.

Figure 7:
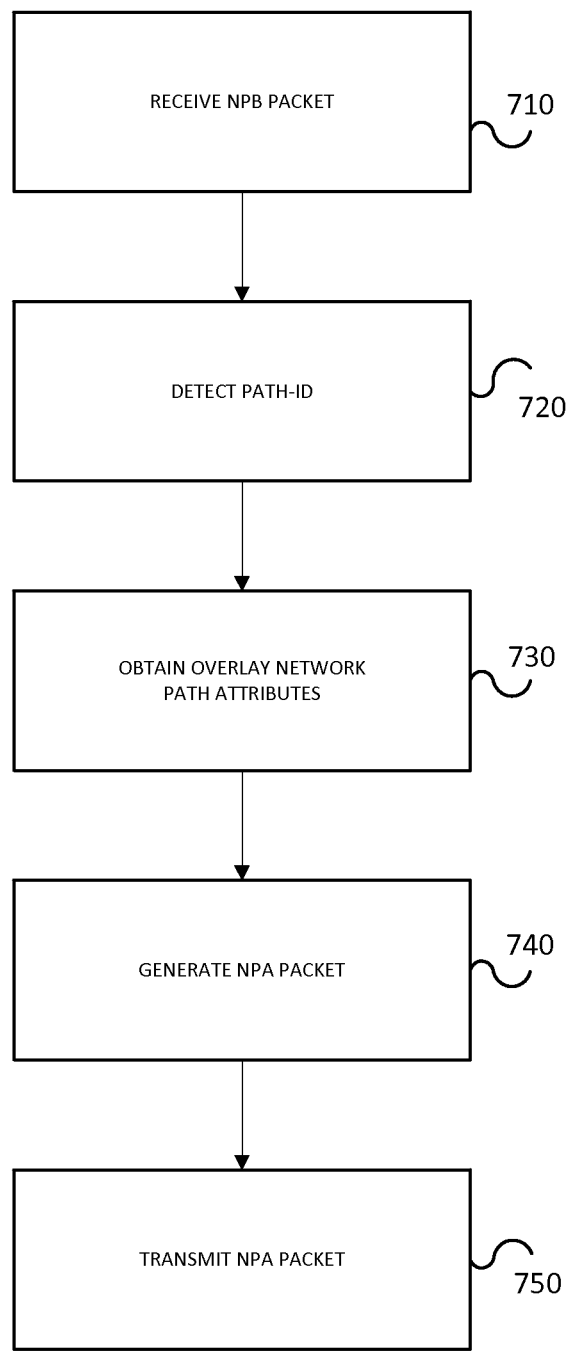
FIG. 7 illustrates a method for establishing a path to a target Edge Bridge (EB) using networking protocols by a source EB according to an embodiment.

FIG. 7 illustrates a method for establishing a path to a target EB using networking protocols by a source EB according to an embodiment.

At 710, a network protocol blind packet is received from a server 101. The network protocol blind packet includes a target address of the data packet, a source address of the data packet, the path-id, the data, and the error detection code information. The target address and the source address are VM addresses of the final destination virtual machine of the data packet and virtual machine that originated the data packet, respectively. In an embodiment, the virtual machine addresses are MAC addresses. At 720, the path-id in the received network protocol blind packet is detected and provided to the protocol aware network path indication unit 302. At 730, the path-id is used, for example as a look-up key, to obtain the network path information (i.e., path characteristics) to be applied on the data packet in order to transmit the data packet to another data communication unit (i.e., EB) in the network.

According to an embodiment, the protocol aware correlation storage 305, which may be a path table, stores path identification information with the network protocol related properties. The network protocol properties may include information regarding the bridge target port, tunnel header format, etc. The protocol aware network path indication unit 302 accesses the protocol aware correlation storage 305 and retrieves path characteristics information corresponding to the path-id in the received data packet that matches the path identification information.

At 740, after obtaining the path characteristics, a network protocol aware data packet is generated in which the path characteristics information is bound to the data packet. The network protocol aware data packet includes a target address of the data packet, a source address of the data packet, path characteristics, the data, and the error detection code information. In an embodiment, the path characteristics are included in the header of the network protocol aware data packet, and the target address of the data packet, source address of the data packet, the data, and the error detection code information are included in the payload of the network protocol aware data packet. The path characteristics may include network frame encapsulation protocol information such as IP, TRILL, PBB, MPLS, etc. At 750, the network data packet encapsulated with the appropriate network protocol information is transmitted to another data communication unit (i.e., EB) in the network.

Figure 8:
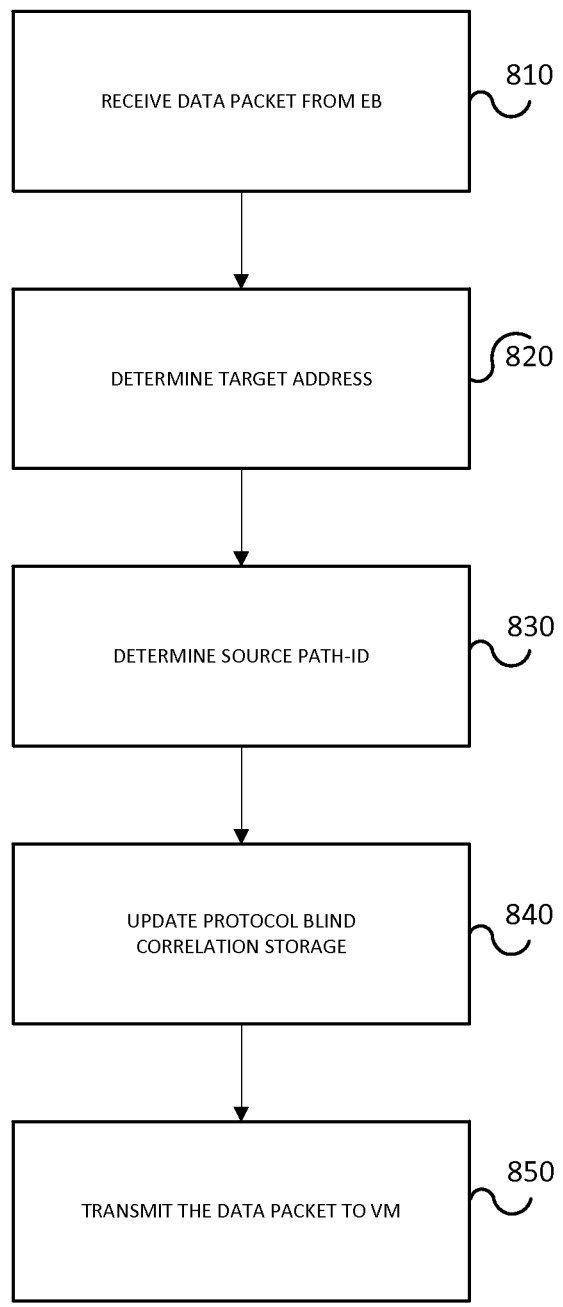
FIG. 8 illustrates a method performed by a Virtual Machine Monitor (VMM) for receiving a data packet from an EB and transmitting the data packet to a VM according to an embodiment.

FIG. 8 illustrates a method performed by a VMM for receiving a data packet from an EB and transmitting the data packet to a VM according to an embodiment.

Referring to FIG. 8, at 810, a data packet is received from an EB 102_C connected to the overlay network. At 820, a target address (i.e., destination address of the VM) of the data packet that is included in the received data packet is determined.

At 830, a source path-id included in the received data packet corresponding to the path of the data packet through the overlay network is determined. At 840, the protocol blind correlation storage 305 updated according to the determined path-id such that the source address (originator VM) of the data packet is associated with the path-id corresponding to the path of the data packet through the overlay network.

At 850, the data packet is transmitted to the destination VM according to the determined target address, EVB S-channel or BPE E-Tag.

Figure 9:
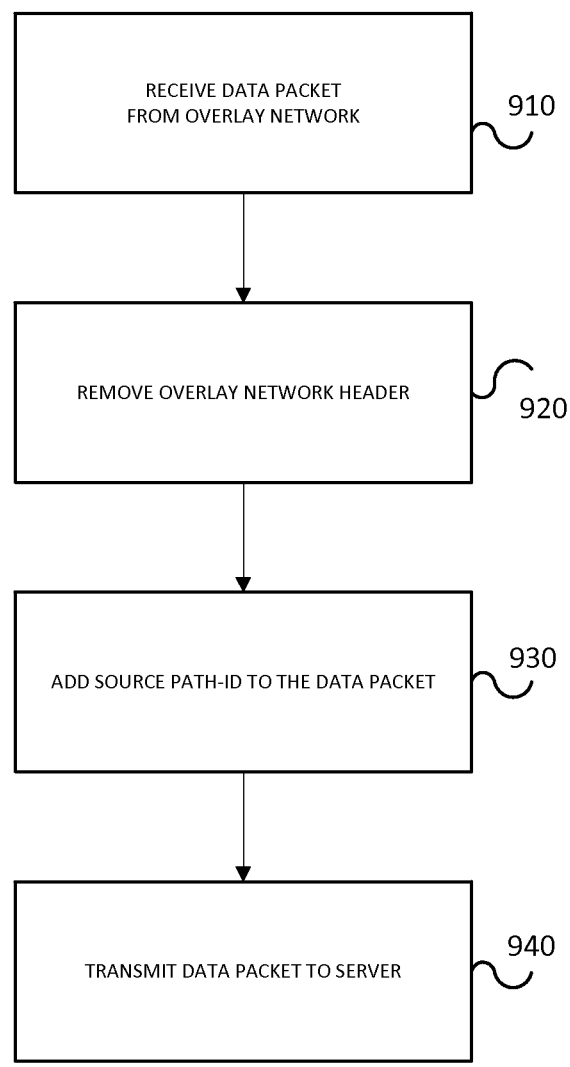
FIG. 9 illustrates a method performed by an EB for receiving a data packet from the overlay network and transmitting the data packet to a server according to an embodiment.

FIG. 9 illustrates a method performed by an EB for receiving a data packet from the overlay network and transmitting the data packet to a server according to an embodiment.

At 910, a data packet is received from the overlay network. At 920, the overlay network header is removed from the data packet. At 930, a path-id associated with the path of the data packet through the overlay network, is added to the data packet. The path-id is obtained by searching the protocol aware correlation storage 505 using the overlay network header. At 940, the data packet with the path-id is transmitted to the server 101_C.

Although the inventive concept has been described above with respect to the various embodiments, it is noted that there can be a variety of permutations and modifications of the described features by those who are familiar with this field, without departing from the technical ideas and scope of the features, which shall be defined by the appended claims.

A method of one or more embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a programmable processor.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be noted that all embodiments do not require the distinction of various system components made in this description. The program components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A network device of a server having a processor and a storage, the network device comprising:
   a communication unit configured to receive a data packet to be transmitted to a destination in a data communications network;
   a protocol blind network path indication unit configured to obtain an indicator corresponding to a predetermined network path through an overlay network comprising one or more tunnels having one or more attributes connecting a first network switch to a second network switch in the data communications network, using a destination address of the data packet, the predetermined network path corresponding to one of the one or more tunnels; and
   a network protocol blind packet generation unit configured to generate a network protocol blind packet including:
   the data packet, and
   the indicator to the predetermined data path in the data communications network, the network protocol blind packet being generated independent of a network protocol of the overlay network.

2. The network device of claim 1, wherein the predetermined data path is compliant with the network protocol of the overlay network.

3. The network device of claim 1, further comprising:
a protocol blind correlation storage unit configured to store information related to target addresses and indicators corresponding to a plurality of predetermined data paths in the overlay network,
wherein the protocol blind network path indication unit is configured to obtain the indicator corresponding to the predetermined data path by accessing the protocol blind correlation storage unit.

4. The network device of claim 1, wherein the predetermined data path is from a first network switch coupled to the server to a second network switch coupled to another server associated with the destination device.

5. The network device of claim 1, wherein the indicator is a lookup key which includes less information than path characteristics information required to transmit the protocol blind packet over the data communications network.

6. A server comprising the network device as set forth in claim 1.

7. A network switch having a processor and a memory, the switch comprising:
a downstream communication unit configured to receive a network protocol blind packet including a data packet and an indicator corresponding to a predetermined data path through an overlay network comprising one or more tunnels having one or more attributes connecting the network switch to another network switch in a data communications network, the predetermined network path corresponding to one of the one or more tunnels, and the network protocol blind packet being generated independent of a network protocol of the overlay network;
a protocol aware network path indication unit configured to obtain information according to a predetermined protocol related to the predetermined data path from a protocol aware correlation storage for transmitting the network protocol blind packet to the data communication unit; and
an upstream communication unit configured to transmit a network protocol aware packet via the obtained data path through the data communications network.

8. The network switch of claim 7, wherein the switch is coupled to one or more servers, and is configured to receive the data packet from a virtual machine defined in one of the servers, and transmit the packet to a destination virtual machine associated with one of the other switch in the data communications network.

9. The network switch as set forth in claim 7, further comprising:
a combiner configured to generate a network packet header that is compliant with the overlay network corresponding to path information related to the data path obtained from the protocol aware correlation storage and envelops the data packet received by the downstream communication unit with the network packet header.

10. A system supporting data communication through a data communications network, comprising:
a server and a first network switch;
the server being configured to:
translate a destination address of a data packet from the first network switch coupled to the server to a second network switch coupled to another server deploying a destination device into an indicator corresponding to a predetermined path through an overlay network comprising one or more tunnels having one or more attributes connecting the first network switch to the second network switch, the predetermined network path corresponding to one of the one or more tunnels; and
transmit the data packet and the indictor to the first network switch, and
the first network switch being configured to:
receive the data packet and the indicator;
obtain path information corresponding to the data path using the received indicator;
generate a network packet header that is compliant with the overlay network corresponding to the path information related to the data path;
envelop the received data packet with the network packet header; and
transmit the data packet to the destination device via the data path through the overlay network.

11. The system of claim 10, wherein the first network switch is an Edge Bridge.

12. The system of claim 10, wherein the server is configured to translate the destination address into an index by using a network protocol blind table stored in the server.

13. The system of claim 10, wherein the first network switch is configured to obtain the information corresponding to the data path by using a network protocol aware table stored in the first network switch.

14. A method for data communications in a data communications network, comprising:
receiving a data packet to be transmitted to a destination in the data communications network;
obtaining an indicator, corresponding to a predetermined network path through an overlay network comprising one or more tunnels having one or more attributes connecting a first network switch to a second network switch in the data communications network, using a destination address of the data packet, the predetermined network path corresponding to one of the one or more tunnels; and
generating a network protocol blind packet including:
the data packet, and
the indicator to the predetermined data path in the data communications network, the network protocol blind packet being generated independent of a network protocol of the overlay network.

15. The method of claim 14, wherein the predetermined data path is compliant with the network protocol of the overlay network.

16. The method of claim 14, further comprising:
storing, in a protocol blind correlation storage unit, information related to target addresses and indicators corresponding to a plurality of predetermined data paths in the network,
wherein the indicator corresponding to the predetermined data path is obtained by accessing the protocol blind correlation storage unit.

17. The method of claim 14, wherein the predetermined data path is from a first network switch coupled to the server to a second network switch coupled to another server associated with the destination device.

18. The method of claim 14, wherein the indicator is a lookup key which includes less information than path characteristics information required to transmit the protocol blind packet over the data communications network.

19. A method for data communications by a network switch in a data communications network comprising:
receiving a network protocol blind packet including a data packet and an indicator corresponding to a predetermined data path through an overlay network comprising one or more tunnels having one or more attributes connecting a first network switch to a second network switch in the data communications network, the predetermined network path corresponding to one of the one or more tunnels, and the network protocol blind packet being generated independent of a network protocol of the overlay network;

obtaining information according to a predetermined protocol related to the predetermined data path from a protocol aware correlation storage for transmitting the network protocol blind packet to the data communication unit; and transmitting a network protocol aware packet via the obtained data path through the data communications network.

20. The method of claim 19, wherein the switch is coupled to one or more servers, and is configured to receive the data packet from a virtual machine defined in one of the servers, and transmit the packet to a destination virtual machine associated with another switch in the data communications network.

21. The method of claim 19, further comprising:

generating a network packet header that is compliant with the overlay network corresponding to path information related to the data path obtained from the protocol aware correlation storage; and enveloping the data packet received by the downstream communication unit with the network packet header.

* * * * *